United States Patent
Yamamoto et al.

(10) Patent No.: US 11,884,194 B2
(45) Date of Patent: Jan. 30, 2024

(54) ARMREST AND SEAT WITH ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Kaho Hayashi, Mie (JP); Hideki Oshima, Aichi (JP); Takemasa Okumura, Gifu (JP); Takahiko Endo, Gifu (JP); Jun Jin, Gifu (JP); Keiji Makino, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 163 days.

(21) Appl. No.: 17/437,482

(22) PCT Filed: Mar. 3, 2020

(86) PCT No.: PCT/JP2020/008851
§ 371 (c)(1),
(2) Date: Sep. 9, 2021

(87) PCT Pub. No.: WO2020/184278
PCT Pub. Date: Sep. 17, 2020

(65) Prior Publication Data
US 2022/0185158 A1 Jun. 16, 2022

(30) Foreign Application Priority Data
Mar. 11, 2019 (JP) .................. 2019-044040

(51) Int. Cl.
*B60N 2/75* (2018.01)
*A47C 7/54* (2006.01)
(Continued)

(52) U.S. Cl.
CPC .............. *B60N 2/753* (2018.02); *A47C 7/543* (2013.01); *B60N 2/79* (2018.02); *B60R 16/0215* (2013.01); *B60R 16/03* (2013.01)

(58) Field of Classification Search
CPC .......... B60N 2/753; B60N 2/79; A47C 7/543; B60R 16/0215; B60R 16/03
See application file for complete search history.

(56) References Cited

U.S. PATENT DOCUMENTS 4,549,629 A * 10/1985 Komuro ................. B60N 2/753
180/219
2013/0264851 A1* 10/2013 Kim ....................... B60N 2/879
297/217.3
(Continued)

FOREIGN PATENT DOCUMENTS

| JP | 2001-045641 A | 2/2001 |
| JP | 2016-107686 A | 6/2016 |
| JP | 2019-140787 A | 8/2019 |

OTHER PUBLICATIONS

International Search Report issued in WIPO, International Pat. Appl. No. PCT/JP2020/008851, dated Mar. 31, 2020, English translation.
(Continued)

*Primary Examiner* — David R Dunn
*Assistant Examiner* — Tania Abraham
(74) *Attorney, Agent, or Firm* — GREENBLUM & BERNSTEIN, P.L.C.

(57) ABSTRACT

An armrest includes an arm-side wire harness and an arm body member. The arm-side wire harness includes an electric wire and an arm-side connector on an end of the electric wire to be coupled to a mount member-side connector mounted on a mount member. The arm body member includes an arrangement section in which the electric wire of the arm-side wire harness is arranged and a mount member- (Continued)

side wall that is to be arranged opposite the mount member. The arm body member is to be fixed to the mount member while the mount member-side wall being opposite the mount member. The mount member-side wall includes a connector insertion hole through which the mount member-side connector can be inserted. The arm-side connector and the mount member-side connector can be arranged in the arrangement section. The arm body member includes an operation hole that is continuous from the arrangement section.

6 Claims, 19 Drawing Sheets

(51) Int. Cl.
*B60R 16/02* (2006.01)
*B60R 16/03* (2006.01)

(56) References Cited

U.S. PATENT DOCUMENTS

| 2013/0278038 | A1* | 10/2013 | Tame | B60N 2/753 |
| | | | | 297/411.34 |
| 2018/0056837 | A1* | 3/2018 | Lee | H02J 7/0045 |
| 2018/0065521 | A1* | 3/2018 | Vela | B60N 2/0228 |
| 2021/0031660 | A1* | 2/2021 | Yamamoto | B60N 2/797 |

OTHER PUBLICATIONS

International Preliminary Report on Patentability, issued in WIPO, International Pat. Appl. No. PCT/JP2020/008851, dated Aug. 25, 2021, English translation.

* cited by examiner

ARMREST AND SEAT WITH ARMREST

TECHNICAL FIELD

The technology disclosed herein relates to an armrest including a wire harness and a seat with the armrest.

BACKGROUND ART

An armrest described in Japanese Unexamined Patent Application Publication No. 2016-107686 (Patent Document 1 described below) has been known as an armrest that is to be mounted in a vehicle. Such an armrest is mounted on a console of the vehicle. The armrest includes a box-shaped housing member in which a connection cord is arranged. A connection terminal that is connected to an end portion of the connection cord is connected to a socket such as an USB socket. The armrest is mounted on the console and a wire harness for supplying power to the socket is routed from a vehicle body to the inside of the armrest through the console.

RELATED ART DOCUMENT

[Patent Document]
[Patent Document 1] Japanese Unexamined Patent Application Publication No. 2016-107686

SUMMARY OF THE INVENTION

Problem to be Solved by the Invention

One example of a process of mounting the armrest on a mount member, which is different from the console, such as a side surface of the seat is described as follows. After connecting a mount member-side connector of a mount member-side wire harness that is mounted in the mount member and an armrest-side connector of an arm-side wire harness that is mounted in the armrest, the armrest is fixed to the mount member.

However, in performing the above process, if a sufficient space for coupling the mount member-side connector and the armrest-side connector cannot be provided between the mount member and the armrest, the operability of mounting the armrest may be lowered.

The technology for improving the operability of mounting the armrest will be described.

Means for Solving the Problem

The technology disclosed herein is an armrest including an arm-side wire harness and an arm body member. The arm-side wire harness includes an electric wire and an arm-side connector that is on an end of the electric wire and is to be coupled to a mount member-side connector mounted on a mount member. The arm body member includes an arrangement section in which the electric wire of the arm-side wire harness is arranged and a mount member-side wall that is to be arranged opposite the mount member. The arm body member is to be fixed to the mount member while the mount member-side wall being opposite the mount member. The mount member-side wall includes a connector insertion hole through which the mount member-side connector can be inserted. The arm-side connector and the mount member-side connector can be arranged in the arrangement section. The arm body member includes an operation hole that is continuous from the arrangement section.

According to the armrest having such a configuration, when the arm body member is fixed to the mount member such that the mount member-side wall is opposite the mount member, the mount member-side connector can be put in the arrangement section through the connector insertion hole and the mount member-side connector and the arm-side connector can be coupled together through the operation hole.

After the mount member-side connector and the arm-side connector are coupled together, the connectors can be arranged in the arrangement section. Therefore, the process of arranging the connectors can be performed easily and this improves the operability of mounting the armrest on the mount member.

The armrest described herein may include configurations as follows.

The armrest may further include a cover that is attached to the arm body member to close the operation hole.

According to such a configuration, the operation hole can be closed after the mount member-side connector and the arm-side connector are coupled together. Therefore, the connectors arranged in the arrangement section can be protected and the arm body member is less likely to be reduced in strength compared to a configuration in which the operation hole is not closed.

The electric wire that has a length including a coupling stroke length necessary for coupling the mount member-side connector and the arm-side connector may be arranged in the arrangement section.

Each of the wire harnesses needs to have the extra wire portion in the electric wire corresponding to the coupling stroke length to couple the mount member-side connector and the arm-side connector together. However, an additional process is necessary for dealing with the extra wire portion corresponding to the coupling stroke length after coupling the connectors together.

According to the above configuration, the electric wire including the extra wire portion corresponding to the coupling stroke length for coupling the mount member-side connector and the arm-side connector can be arranged in the electric wire routing cavity. With such a configuration, the extra wire portions of the electric wires included in the seat-side wire harness and the arm-side wire harness can be easily handled. This improves the operability of mounting the armrest on the mount member.

The technology disclosed herein is a seat with an armrest including the armrest described above and the mount member. The mount member may be the seat and the mount member-side connector may be fixed to a holder that is mounted on the seat. The mount member-side connector that is fixed to the holder may be inserted in the arrangement section through the connector insertion hole when the arm body member is fixed to the mount member.

According to such a configuration, when the arm body member is fixed to the seat, the mount member-side connector that is fixed to the holder is arranged in the arrangement section. This makes the connector to be coupled to the mount member-side connector easily and the coupling operation through the operation hole can be performed more easily. This further improves the operability of mounting the armrest on the seat.

The holder may include an electric wire arrangement portion in which the electric wire extending from the mount member-side connector is routed from the seat toward the armrest to cover side portions of the electric wire. The electric wire arrangement portion may be inserted through the connector insertion hole when the arm body member is fixed to the mount member.

According to such a configuration, the electric wire of the mount member-side connector is less likely to be damaged by the hole edge of the connector insertion hole due to vibrations.

The holder may include a connector mount portion to which the mount member-side connector is coupled such that a coupling direction of the mount member-side connector is parallel to the mount member-side wall.

According to such a configuration, when the mount member-side connector and the arm-side connector are coupled together, the connectors are disposed parallel to the mount member-side wall. This suppresses the thickness of the arm body member including the arrangement section in the mounting direction from increasing and suppresses the thickness of the armrest in the mounting direction from increasing.

Advantageous Effects of the Invention

According to the technology disclosed herein, operability of mounting the armrest can be improved.

MODES FOR CARRYING OUT THE INVENTION

Embodiment

One embodiment of the technology described herein will be described with reference to FIGS. 1 to 19.

A seat with an armrest 10 according to this embodiment is to be mounted in a vehicle and includes a seat frame (one example of a mount member) 90 and an armrest 20 that is fixed to the seat frame 90. The seat frame 90 is included in a left side section of a seat (one example of the mount member) 80 of the vehicle. In the following description, with reference to a front-rear direction, a F side and a B side correspond to a front side and a rear side, respectively, a L side and a R side correspond to a left side and a right side, respectively, and a U side and a D side correspond to an upper side and a lower side, respectively.

Figure 1:
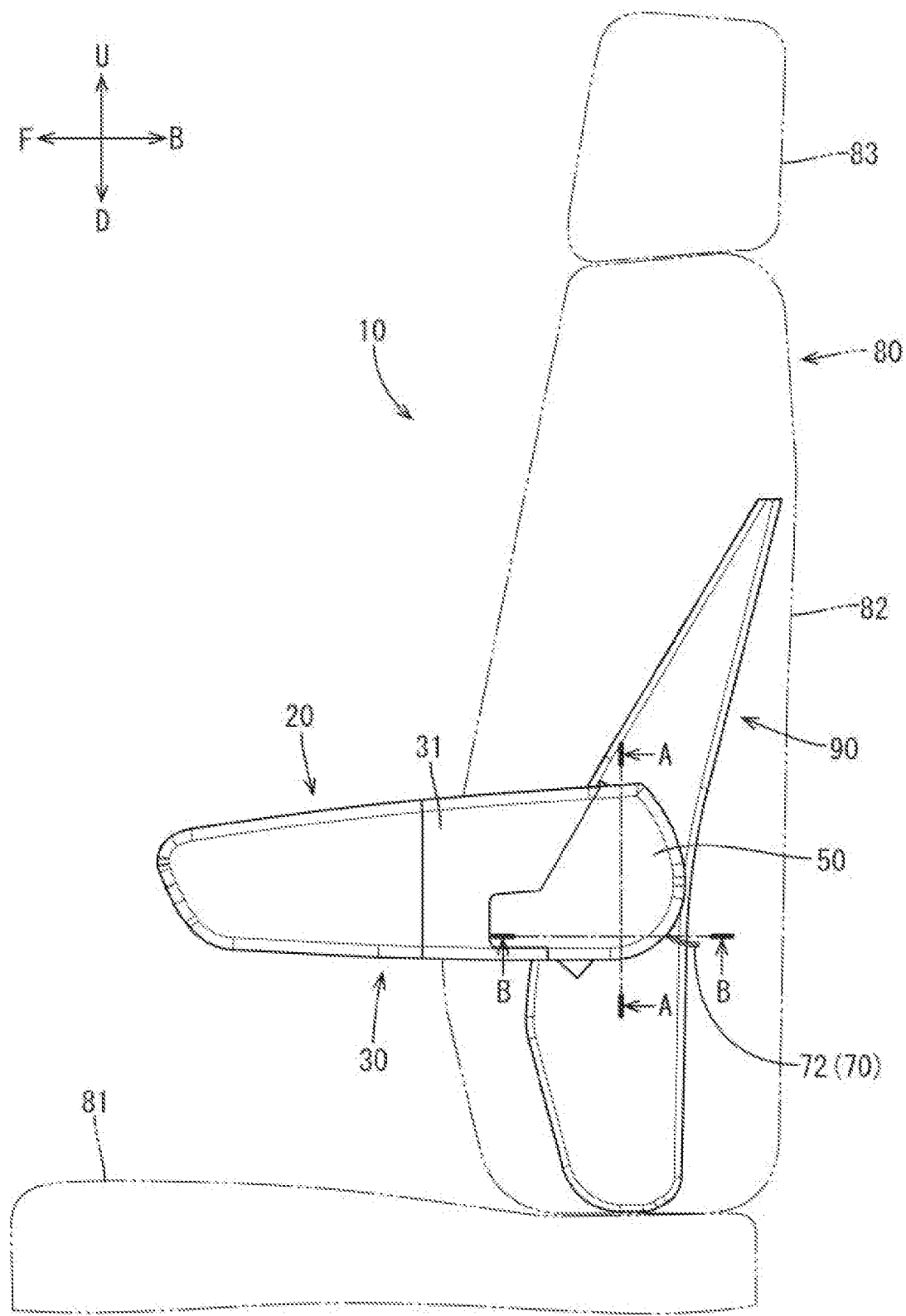
FIG. 1 is a side view illustrating a seat with an armrest.
Figure 7:
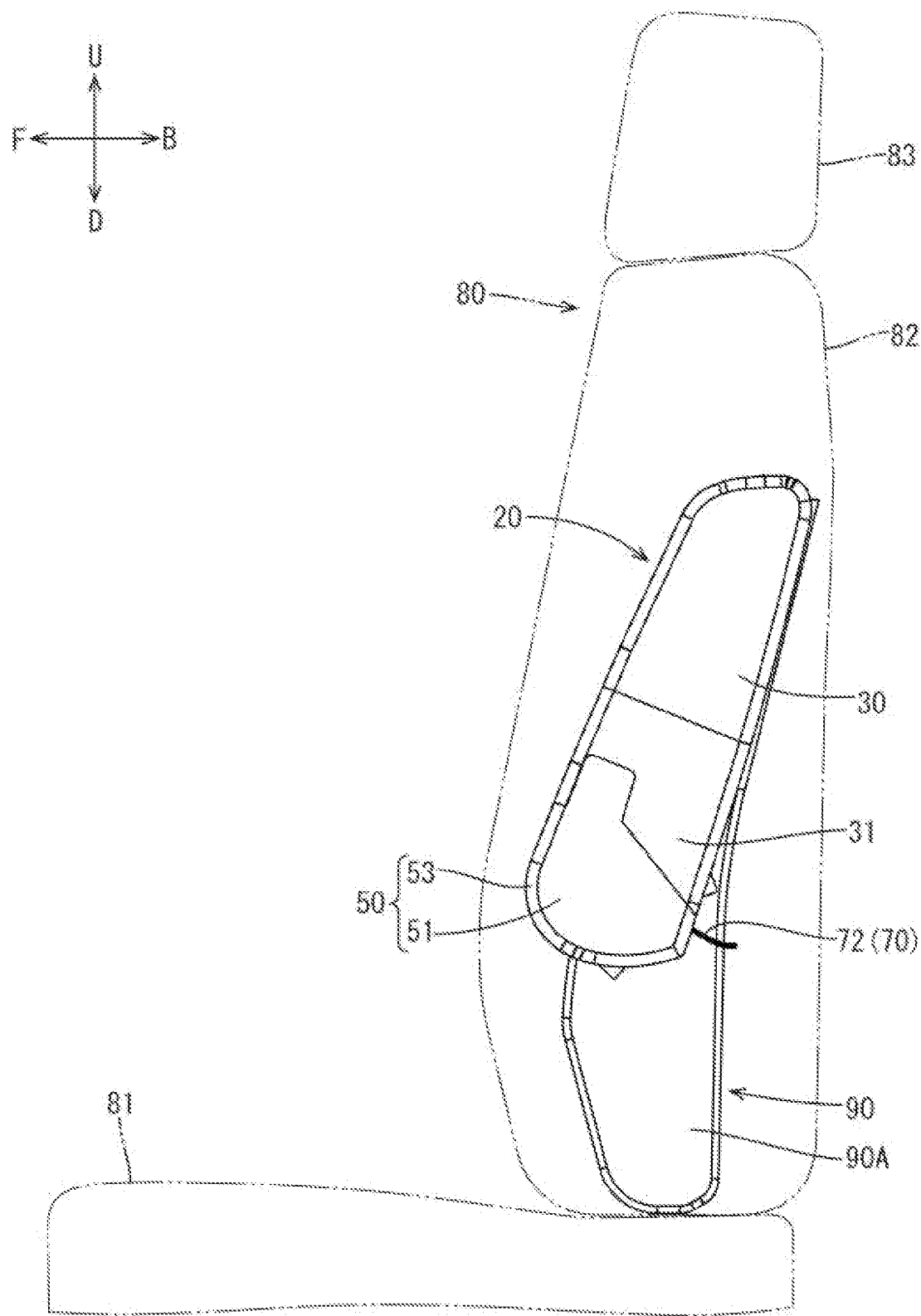
FIG. 7 is a side view illustrating the armrest that is fixed to the seat frame and in a lift-up position.

As illustrated in FIGS. 1 and 7, the seat 80 includes a seat base 81 on which a passenger is seated, a backrest 82 extending upward from a rear end portion of the seat base 81, a headrest 83 mounted on an upper end portion of the backrest 82, and a seat-side wire harness 70.

Figure 2:
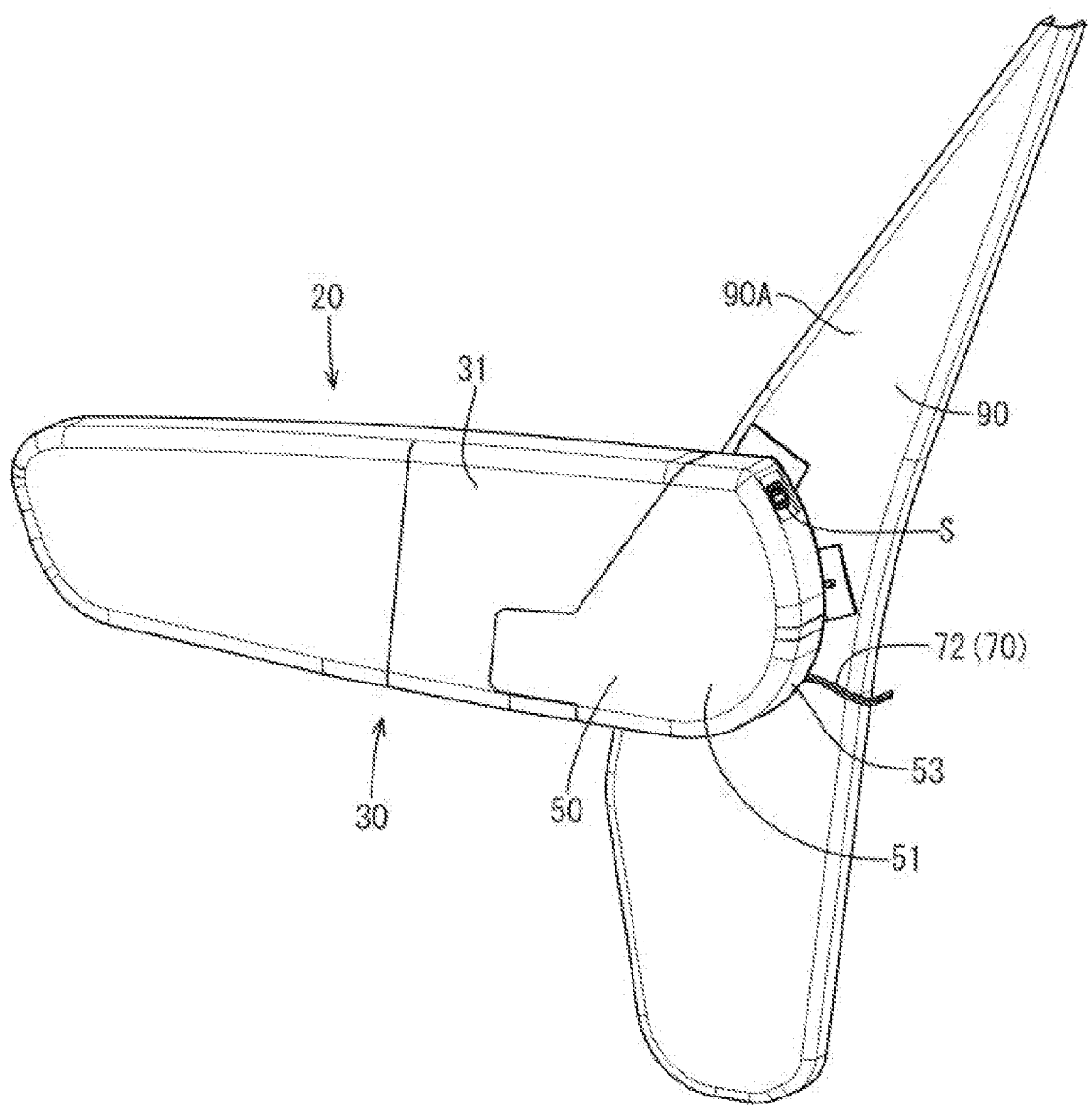
FIG. 2 is a perspective view illustrating the armrest that is fixed to a seat frame and in an arm support position.
Figure 3:
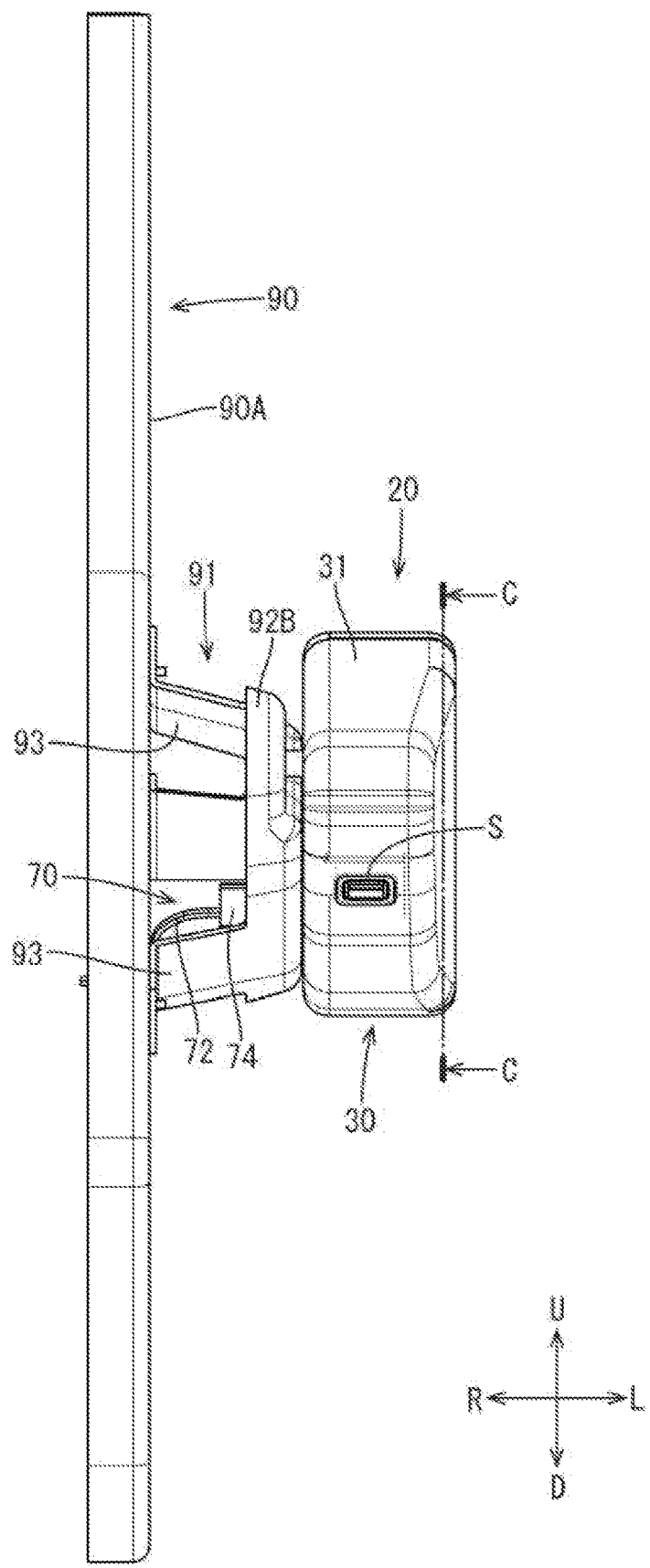
FIG. 3 is a front view illustrating the armrest that is fixed to the seat frame and in the arm support position.

The backrest 82 includes the seat frames 90 made of metal on right and left sides thereof within the backrest 82. As illustrated in FIGS. 1 to 3, the seat frame 90 is vertically elongated and includes a bracket (one example of the mount member) 91 on an outer surface 90A of the seat frame 90.

The bracket 91 is made of metal. As illustrated in FIGS. 3 and 13 to 15, the bracket 91 includes a mount plate 92 that is opposite the armrest 20 in the right-left direction and leg pieces 93 with which the bracket 91 is fixed to the seat frame 90.

The mount plate 92 has substantially an oval shape and is long in a distance between an obliquely upper front portion and an obliquely lower rear portion. The mount plate 92 is substantially parallel to and opposite the outer surface 90A of the seat frame 90. The mount plate 92 includes a bolt insertion hole 92A in a middle section thereof and the bolt insertion hole 92A extends through the mount plate 92 in a thickness direction. A support bolt B is to be inserted through the bolt insertion hole 92A to fix the bracket 91 and the armrest 20.

A frame edge portion 92B extends from an outer periphery of the mount plate 92 to be curved toward the seat frame 90.

The frame edge portion 92B includes the leg pieces 93 that are spaced away from each other in a peripheral direction. Each of the leg pieces 93 extends from the frame edge portion 92B toward the outer surface 90A of the seat frame 90.

Extended ends of the respective leg pieces 93 are bent along the outer surface 90A of the seat frame 90 and the bent portions are fixed to the seat frame 90 with a known method such as welding and screwing with bolts. Thus, the bracket 91 is fixed to the seat frame 90. In this embodiment, the three leg pieces 93 are fixed to the seat frame 90 with welding to fix the bracket 91 to the seat frame 90.

The mount plate 92 and the frame edge portion 82B include a hole 94 having a quadrangular shape extending frontward from a rear and lower portion of the frame edge portion 92B. The hole 94 is through the frame edge portion 92B and the mount plate 92 in the thickness direction thereof.

As illustrated in FIGS. 1 to 6, the armrest 20 has a box shape that is elongated in the front-rear direction (one direction) and slightly thick in the right-left direction. The armrest 20 has a rear end section having a round shape so as to project rearward and a front end section that is tapered frontward. The armrest 20 is covered with a cover member such as fabric, leather or other material and the inside of the cover member may be filled with foaming resin. In this embodiment, the cover member and the foaming resin are not illustrated for easy understanding of the configuration of the armrest 20.

As illustrated in FIGS. 2 and 3, the armrest 20 includes electronic sockets S in the front end section and the rear end section thereof, respectively. Each of the electronic sockets S is a USB port in which a USB (universal serial bus) connector to be connected to a portable device is plugged. In this embodiment, the armrest 20 includes the electronic sockets S both in the front end section and the rear end section thereof. However, the armrest 20 may include one electric socket S in the front end section thereof.

As illustrated in FIGS. 2 to 6, the armrest 20 includes an arm body member 30, a cover 50, and an arm-side wire harness 22. The arm body member 30 has a thickness in the right-left direction. The cover 50 is attached to the arm body member 30 from a left side that is an opposite side from the seat 80. The arm-side wire harness 22 is routed in the arm body member 30.

Figure 4:
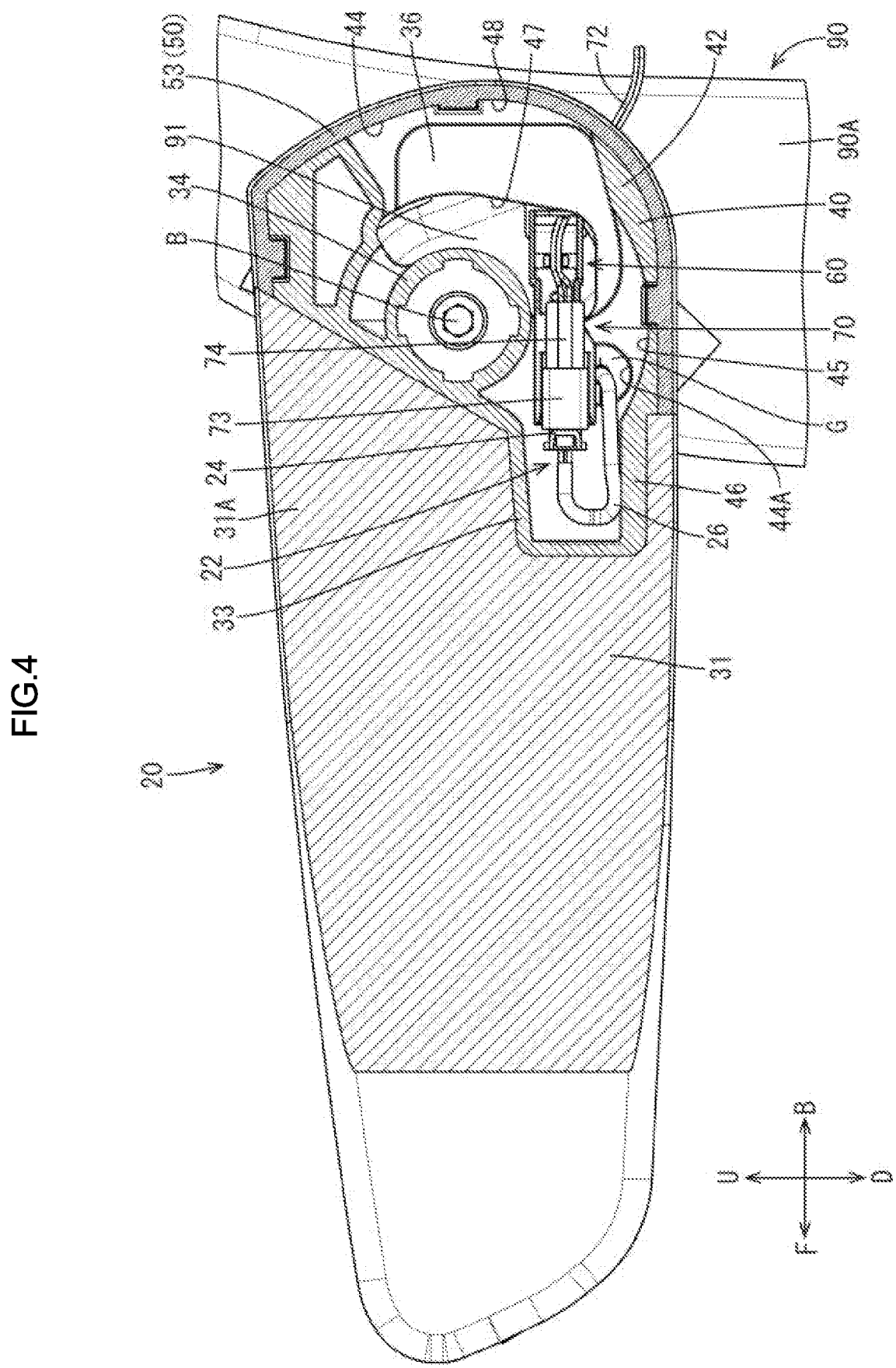
FIG. 4 is a cross-sectional view taken along C-C line in FIG. 3.

The arm body member 30 is made of synthetic resin. As illustrated in FIG. 4, the arm body member 30 is elongated in the front-rear direction and includes a first arm section 31 and a second arm section 40. The first arm section 31 includes a tubular portion 31A having a hood shape and opening rearward. A portion of the second arm section 40 is arranged within the tubular portion 31A. The first arm section 31 and the second arm section 40 are fitted together and configured as the arm body member 30.

Figure 6:
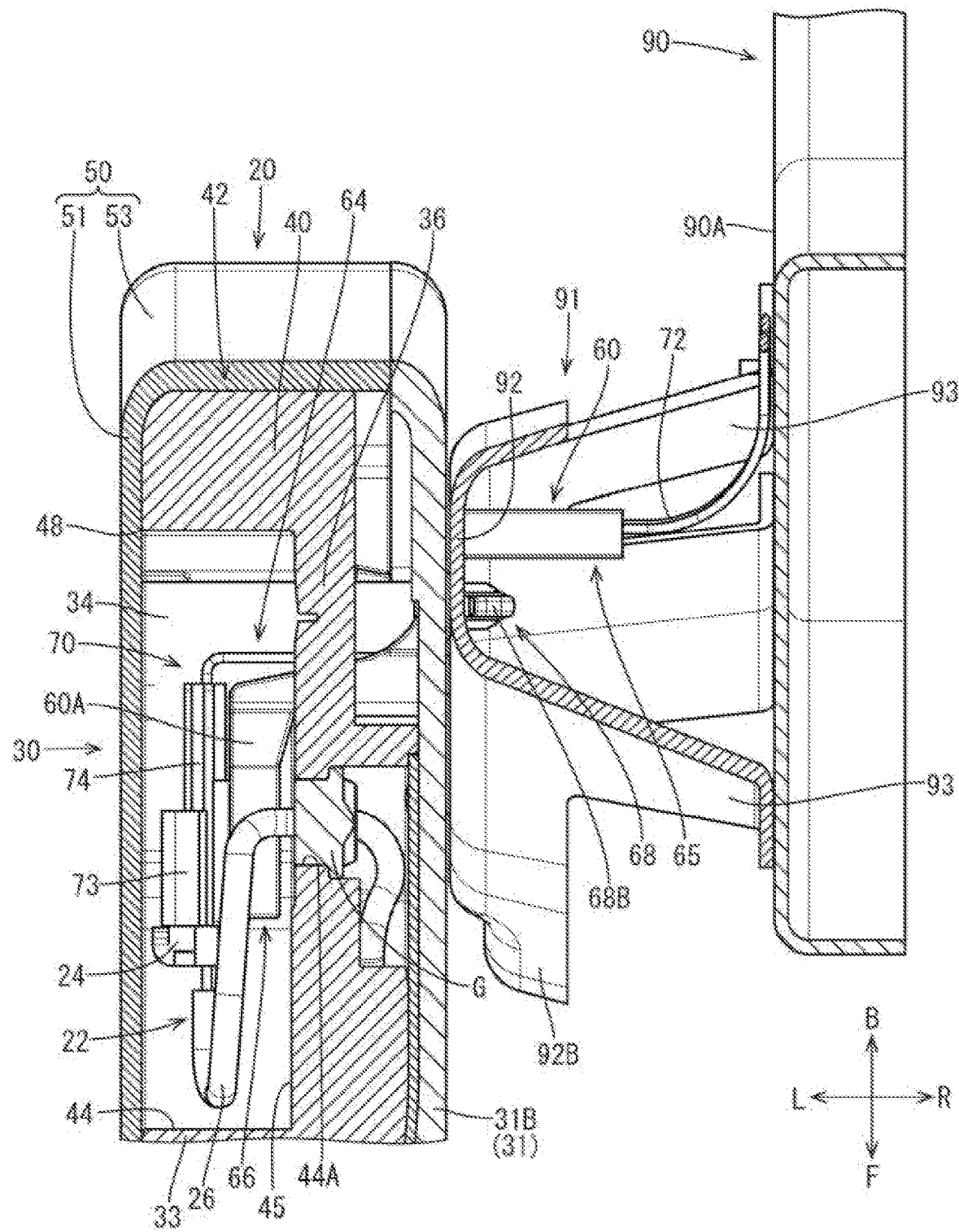
FIG. 6 is a cross-sectional view taken along B-B line in FIG. 1.
Figure 9:
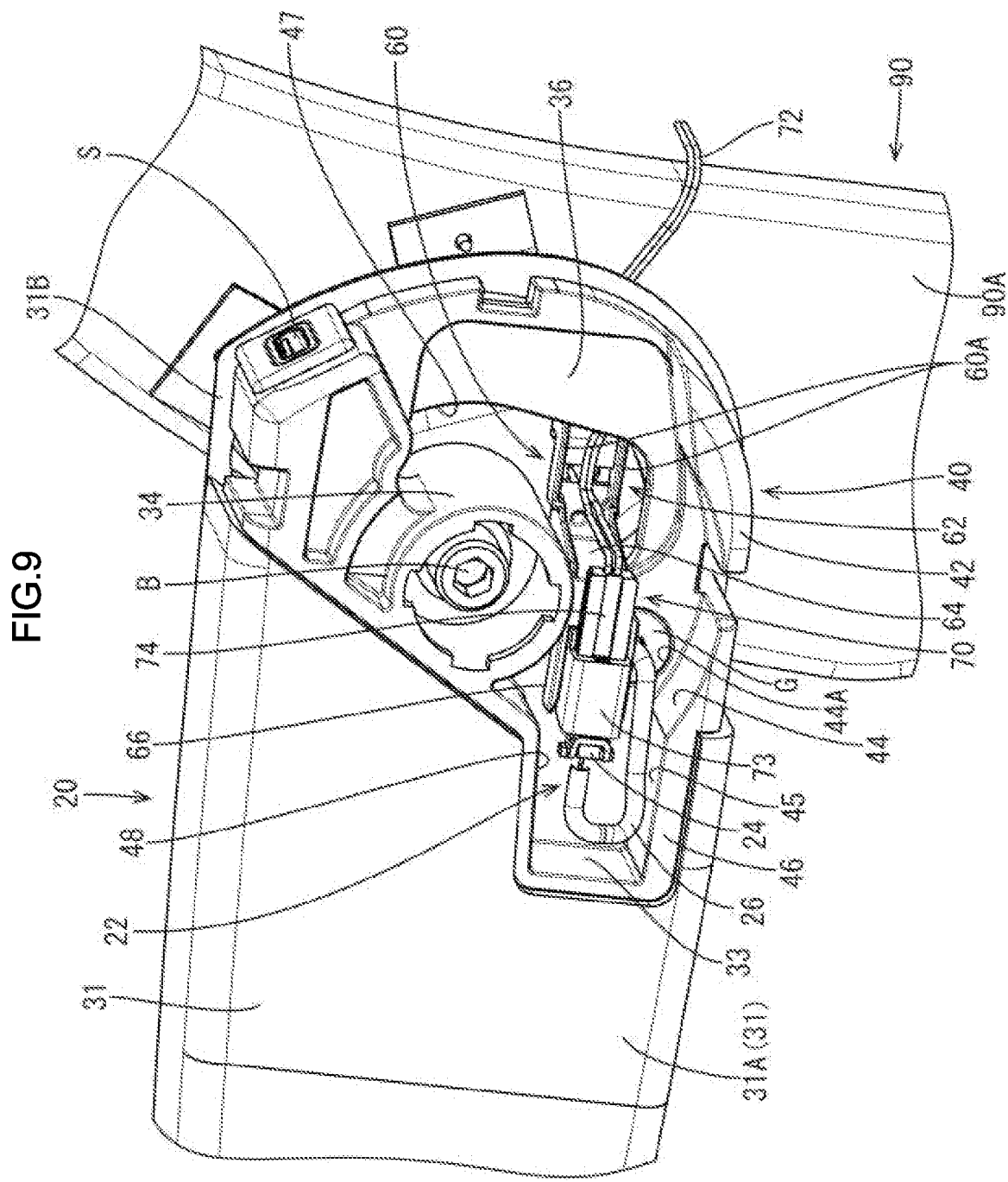
FIG. 9 is an enlarged perspective view illustrating a portion of the armrest from which an outer cover is detached.

The tubular portion 31A of the first arm section 31 is tapered toward the front side and becomes thinner in the vertical direction as it extends frontward. As illustrated in FIGS. 6 and 9, an outer wall (one example of a mount member-side wall) 31B extends rearward from a right wall of the tubular section 31A and the outer wall 31B has a rear end portion having a round shape projecting rearward.

Figure 5:
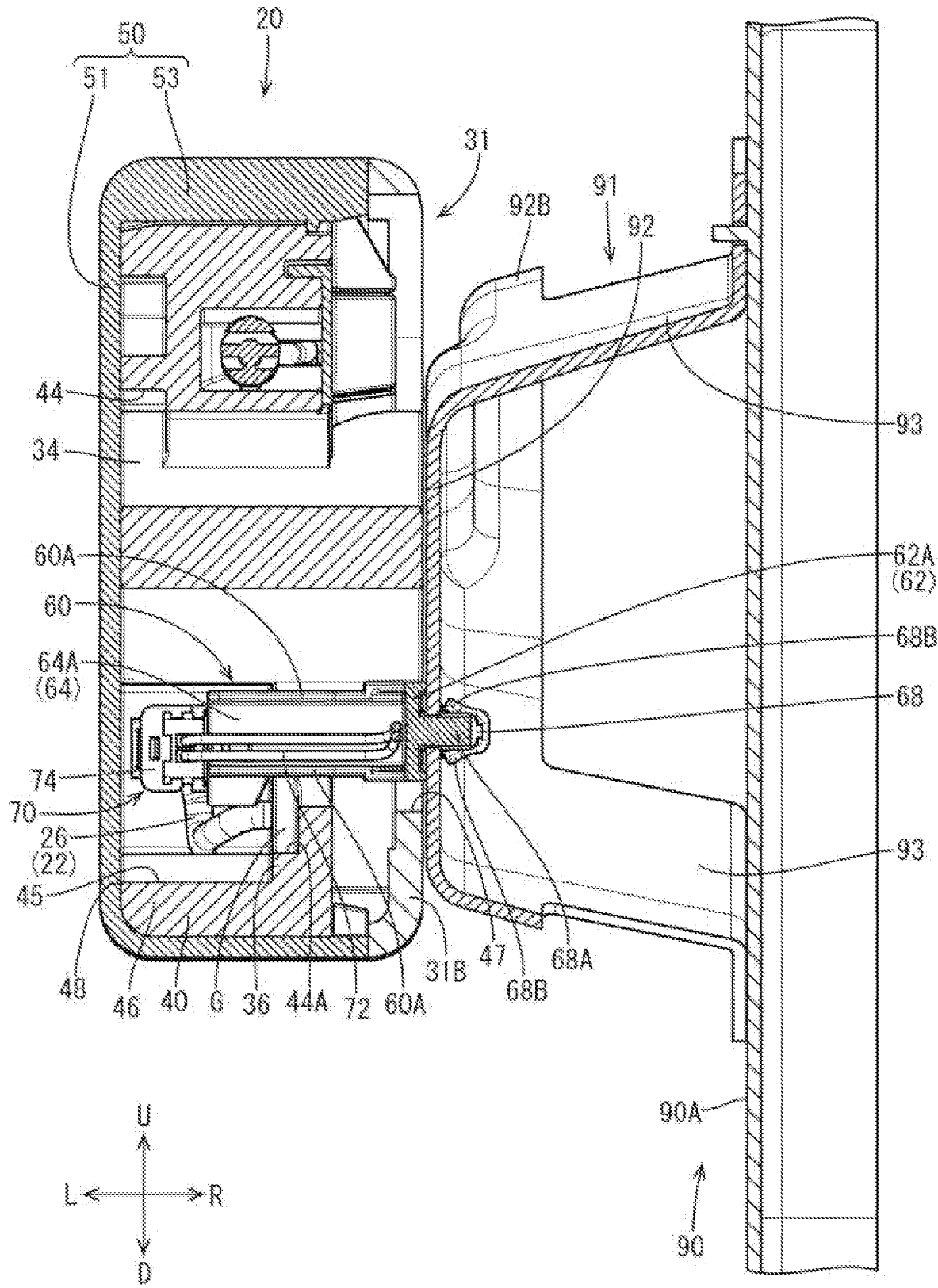
FIG. 5 is a cross-sectional view taken along A-A line in FIG. 1.
Figure 11:
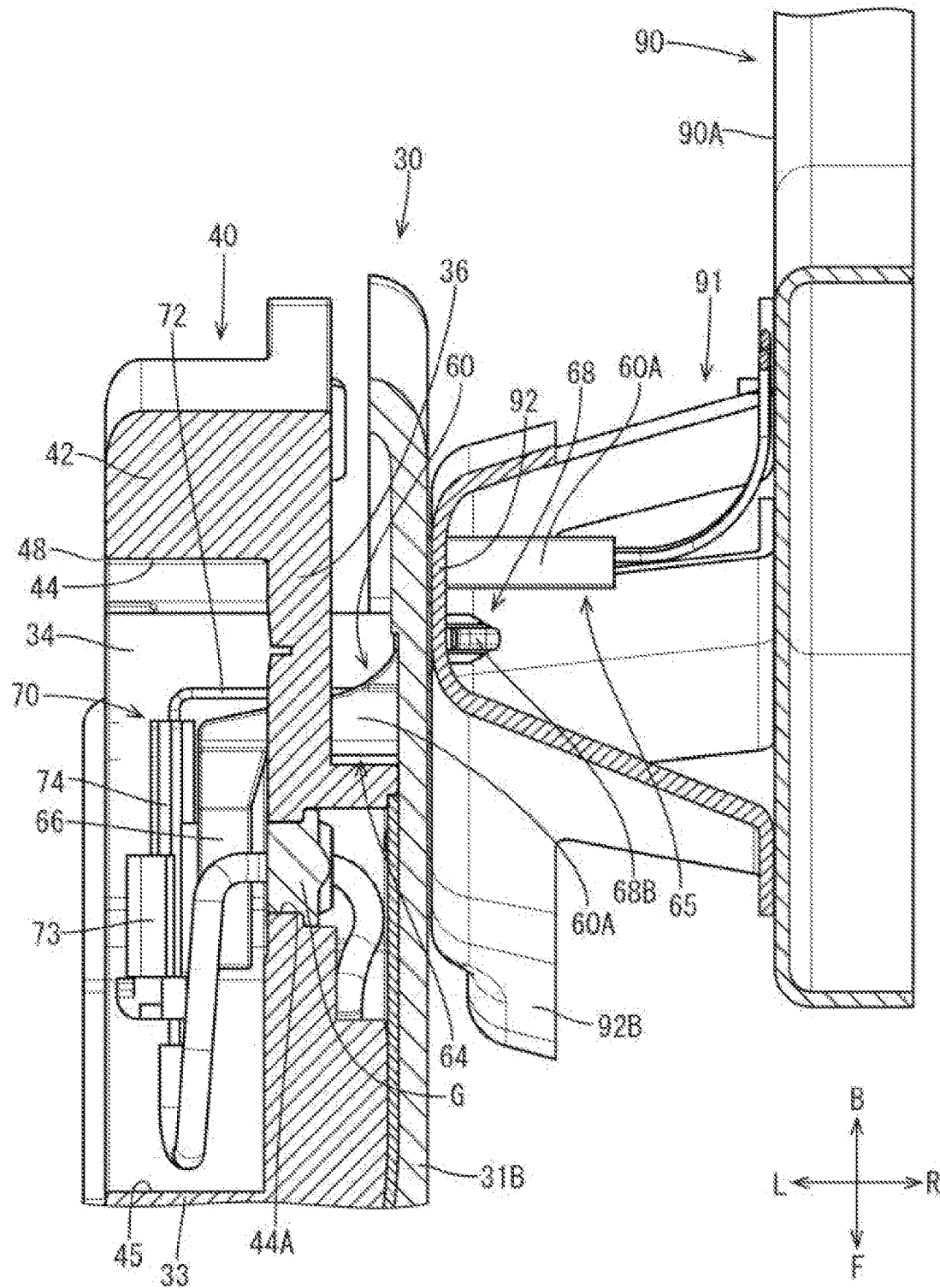
FIG. 11 is a cross-sectional view taken along D-D line in FIG. 10.

As illustrated in FIGS. 5, 6, and 11, the outer wall 31B is opposite and contacted with the mount plate 92 of the bracket 91 with surface contact in the right-left direction when the arm body member 30 is fixed to the bracket 91.

Figure 10:
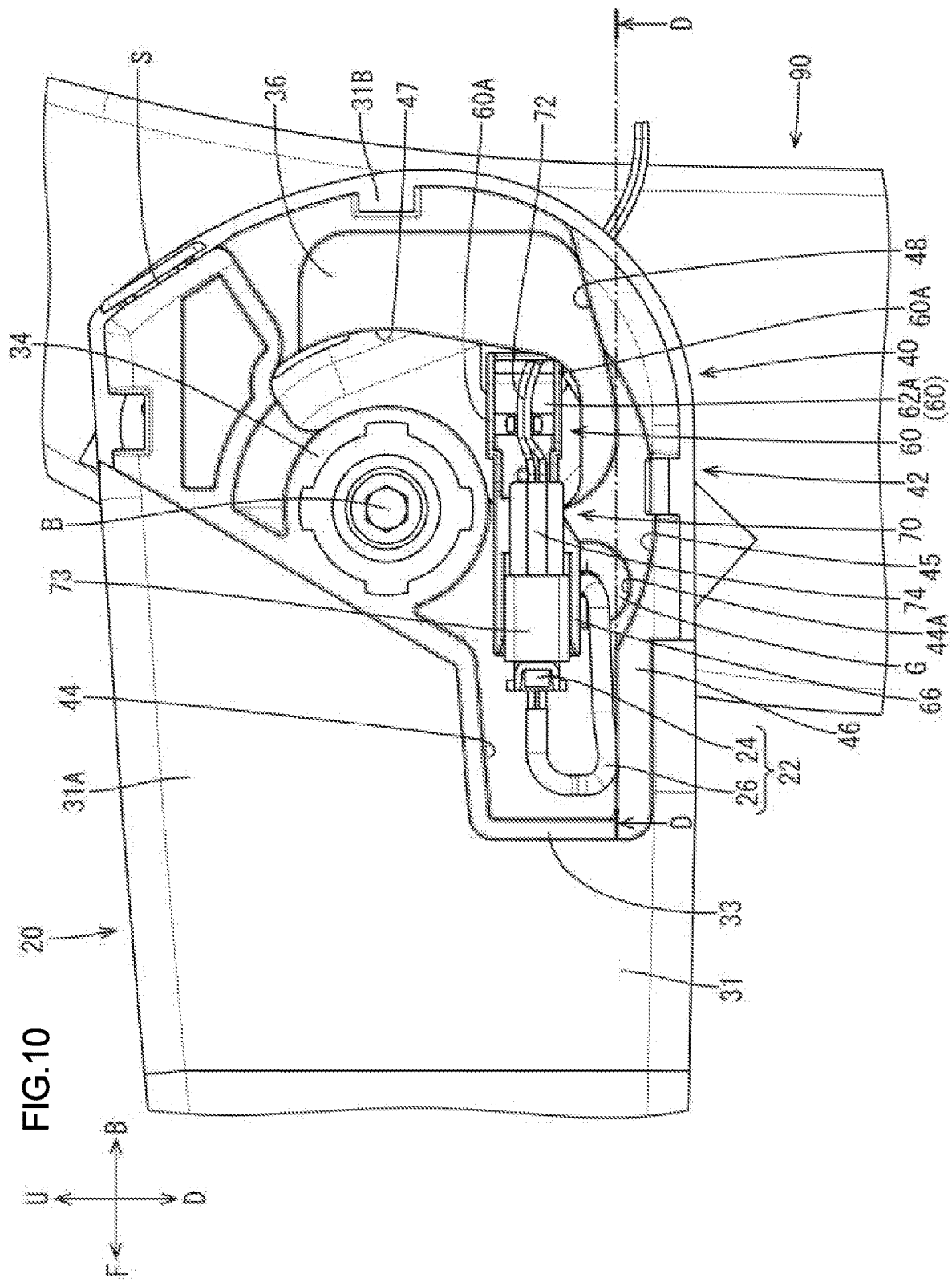
FIG. 10 is an enlarged side view illustrating the portion of the armrest from which the outer cover is detached.

As illustrated in FIGS. 4 and 9, the second arm section 40 includes a front portion that is on a front side with respect to a middle portion in the front-rear direction and the front portion is disposed within the tubular portion 31A of the first arm section 31. As illustrated in FIGS. 9 and 10, the second arm section 40 includes an uncovered portion 42 in a portion thereof that projects rearward than the tubular portion 31A. The uncovered portion 42 has a round shape that projects rearward and has a round outline slightly smaller than that of the outer wall 31B of the first arm section 31.

The second arm section 40 includes a separation wall 33 in a border section between the tubular portion 31A and the uncovered portion 42. The uncovered portion 42 includes a bolt receiving section 34 continuously from the separation wall 33. A support bolt B is to be put in the bolt receiving section 34 from the left side.

The bolt receiving section 34 has a circular outline shape with a side view and as illustrated in FIGS. 9 and 10, the bolt receiving section 34 is recessed inwardly toward the right side. The support bolt B that is put in the bolt receiving section 34 can be inserted through the bolt insertion hole 92A in the bracket 91 of the seat frame 90. The support bolt B inserted in the bolt insertion hole 92A is screwed into two nuts N that are arranged on the right side of the mount plate 92. Thus, the arm body member 30 is pivotably fixed to the bracket 91.

The arm body member 30 is pivotable around the support bolt B with respect to the bracket 91. The guide pin 91A of the bracket 91 is movable within a hole range of a guide hole, which is included in the arm body member 30 and not illustrated, such that the arm body member 30 is pivotably moved between an arm support position and a lift-up position. In the arm support position, the arm body member 30 is about in a horizontal state as illustrated in FIGS. 1 and 2. In the lift-up position, the arm body member 30 is disposed along the seat frame 90 as illustrated in FIG. 7.

Namely, the arm body member 30 is set in the arm support position when using the armrest 20 and the arm body member 30 is set in the lift-up position when the armrest 20 is not used.

As illustrated in FIGS. 9 and 10, the uncovered portion 42 includes an inner wall 36 that is continuous from the right end portion of the bolt receiving section 34 and the separation wall 33. The inner wall 36 is a plate that projects rearward in a round shape. As illustrated in FIGS. 5 and 6, the inner wall 36 is on the inner side and the left side with respect to the outer wall 31B of the first arm section 31 to be opposite the outer wall 31B in the right-left direction.

The cover 50 is attached to the uncovered portion 42 of the second arm section 40 from the left side that is an opposite side from the seat frame 90.

As illustrated in FIGS. 5 and 6, the cover 50 includes a cover body 51 and a peripheral wall 53. The cover body 51 is on the left side with respect to the second arm section 40. The peripheral wall 53 extends from a peripheral edge of the cover body 51 except for a tubular portion 31A side peripheral edge.

Figure 16:
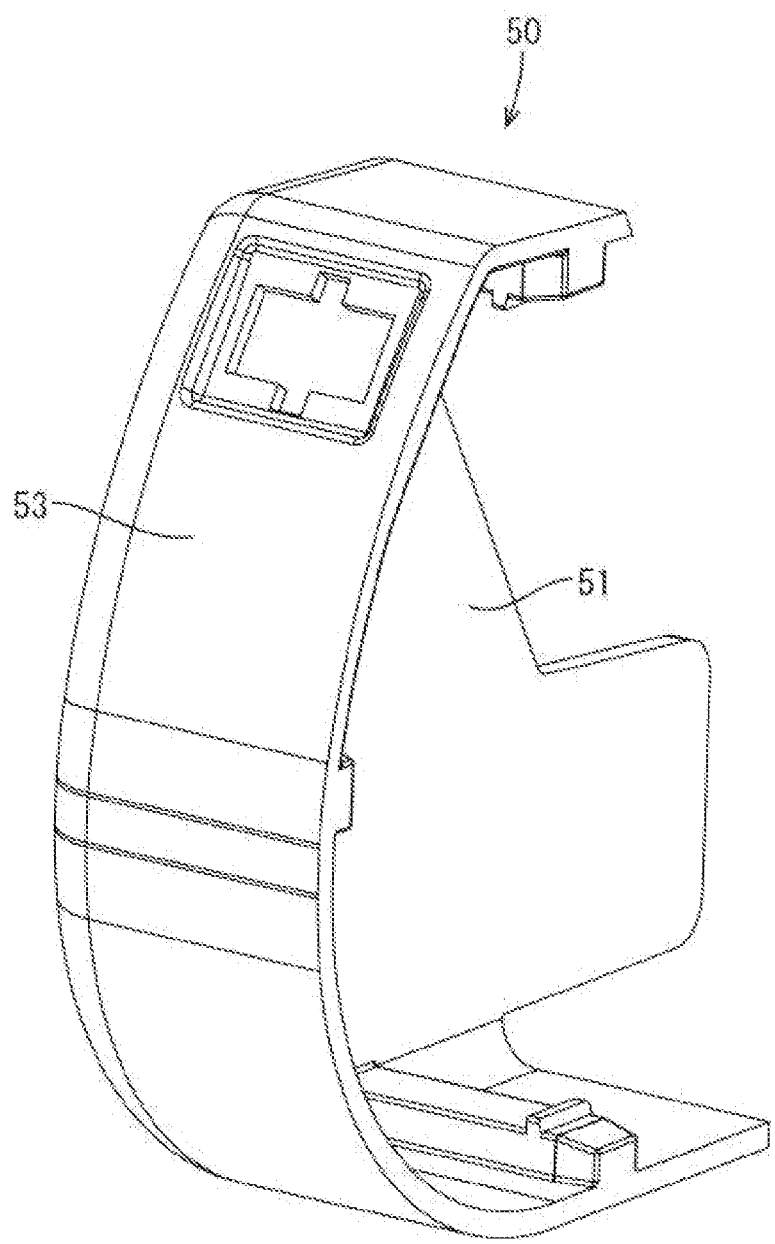
FIG. 16 is a perspective view of a cover.

As illustrated in FIG. 16, the cover body 51 is a flat plate and the peripheral wall 53 extends along an outer shape of the second arm section 40.

As illustrated in FIGS. 1, 2, and 4 to 6, the cover 50 that is fixed to the uncovered portion 42 is configured as an outer wall of a left section and a rear half section of the uncovered portion 42 and the uncovered portion 42 of the second arm section 40 is covered with the cover 50 and the outer wall 31B.

The second arm section 40 includes an electric wire routing cavity, which is not illustrated, for routing an electric wire 26 of the arm-side wire harness 22. The electric wire routing cavity extends in the front-rear direction.

The electric wire routing cavity extends such that a front end thereof is at the electronic socket S that is disposed in the front end section of the armrest 20 and a rear end thereof is at the electronic socket S that is disposed in the rear end section of the armrest 20.

As illustrated in FIGS. 4 to 6 and 8 to 11, the arm-side wire harness 22 includes an arm-side connector 24 that is to be connected to a seat-side connector 74 and electric wires 26 that connect the arm-side connector 24 and the electronic sockets S.

The electric wires 26 extend in the electric wire routing cavity and are connected to the electronic sockets S that are disposed in the front end section and the rear end section of the armrest 20, respectively.

The arm-side connector 24 can be fitted in a fitting portion 73 of the seat-side connector 74. When the arm-side connector 24 is fitted in the fitting portion 73 of the seat-side connector 74, power is supplied via the seat-side wire harness 70 to the arm-side wire harness 22, for example, and the electronic sockets S are supplied with power.

Figure 13:
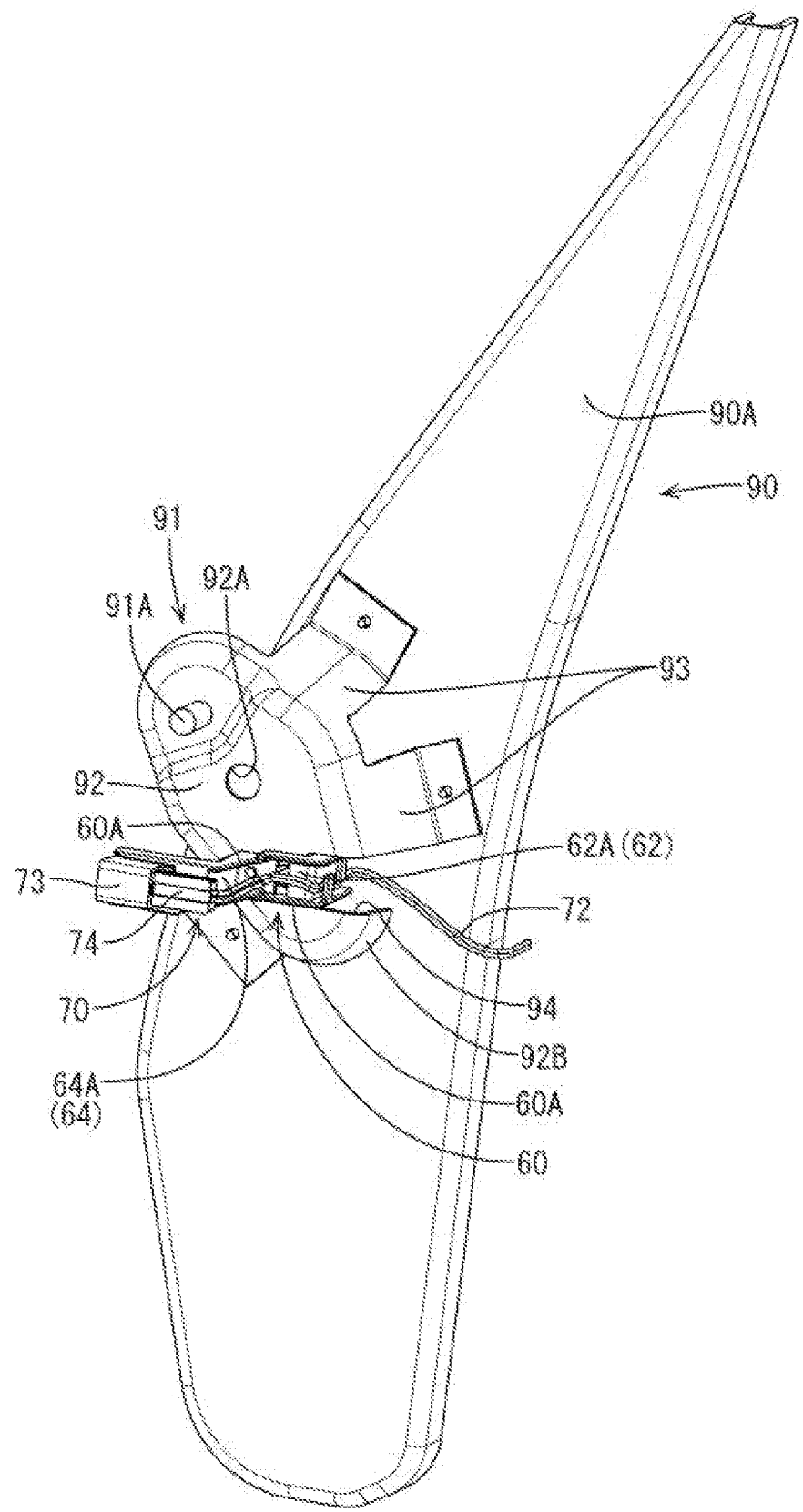
FIG. 13 is a perspective view of the seat frame.
Figure 14:
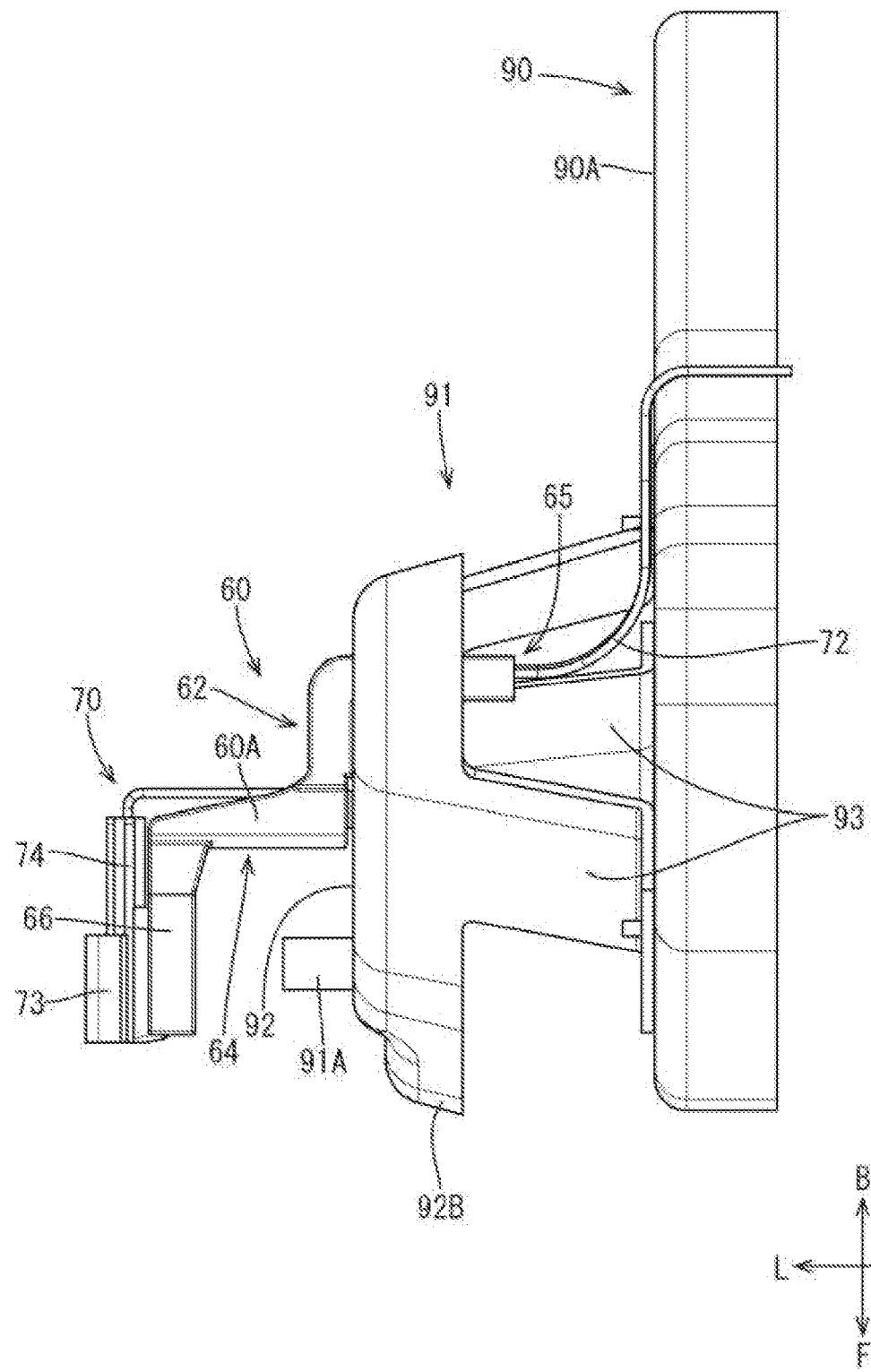
FIG. 14 is a bottom view of the seat frame.
Figure 15:
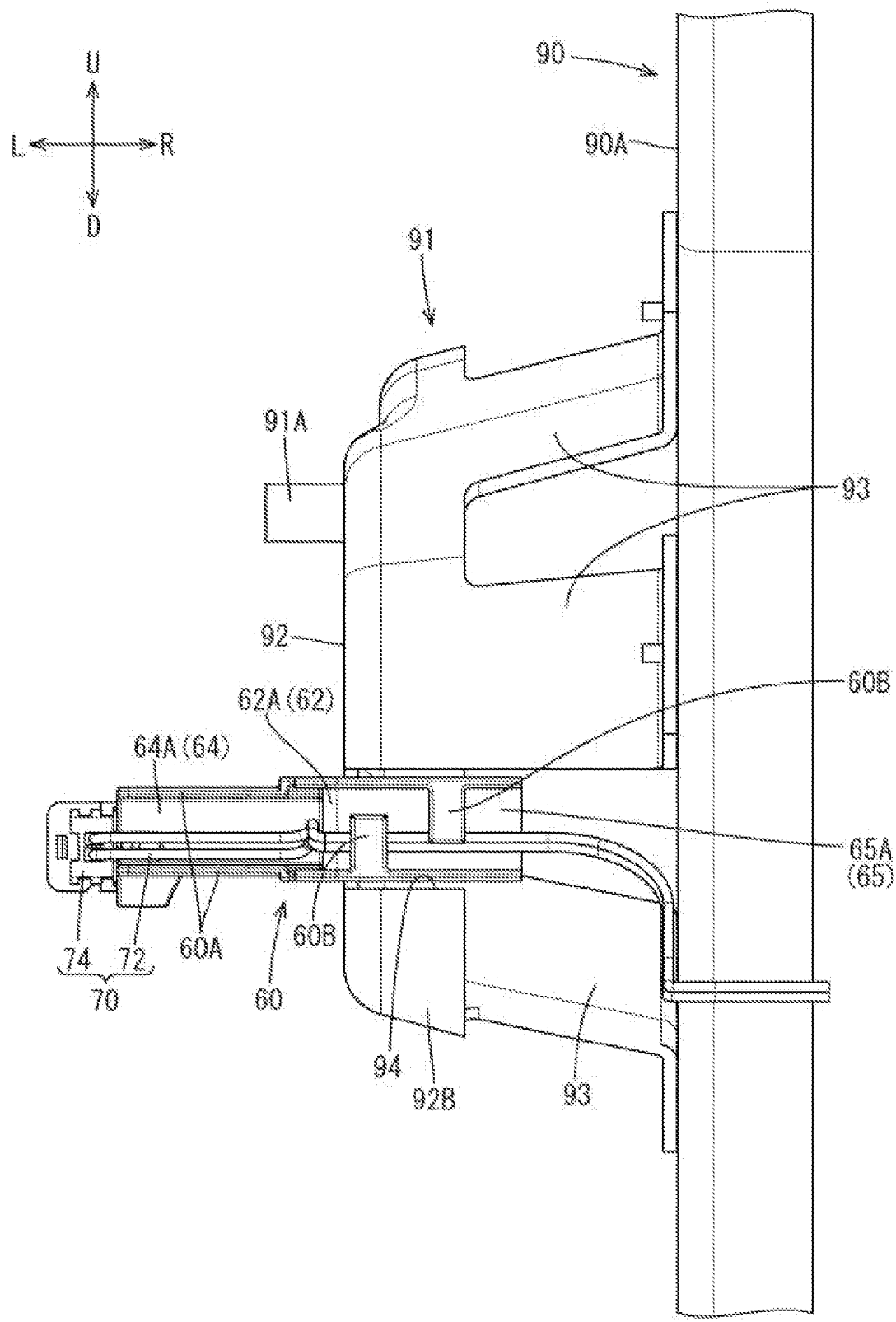
FIG. 15 is an enlarged rear view of a portion of the seat frame.

As illustrated in FIGS. 13 to 15, the seat-side wire harness 70 that is supported by a holding member (one example of a holder) 60 is fixed to the mount plate 92 in a section obliquely lower and rear side with respect to the bolt insertion hole 92A.

The seat-side wire harness 70 includes an electric wire 72 and the seat-side connector (one example of a mount member-side connector) 74. The electric wire 72 extends from the inside of the seat 80 and the seat-side connector 74 includes the fitting portion 73 that is connected to an end of the electric wire 72 and has a hooded shape.

The holding member 60 is made of synthetic resin and is a separate component from the bracket 91 as illustrated in FIGS. 5 and 6. As illustrated in FIGS. 5, 6 and 13 to 15, the holding member 60 includes a fixing portion (one example of an electric wire arrangement portion) 62 that is fixed to the bracket 91, a first electric wire arrangement portion (one example of the electric wire arrangement portion) 64, a second electric wire arrangement portion (one example of the electric wire arrangement portion) 65, and a connector mount portion 66. The electric wire 72 of the seat-side wire harness 70 is routed in the first electric wire arrangement portion 64 from the fixing portion 62 toward the armrest. The electric wire 72 of the seat-side wire harness 70 is routed in the second electric wire arrangement portion 65 from the fixing portion 62 toward the seat frame 90. The seat-side connector 74 of the seat-side wire harness 70 is mounted on the connector mount portion 66.

Figure 17:
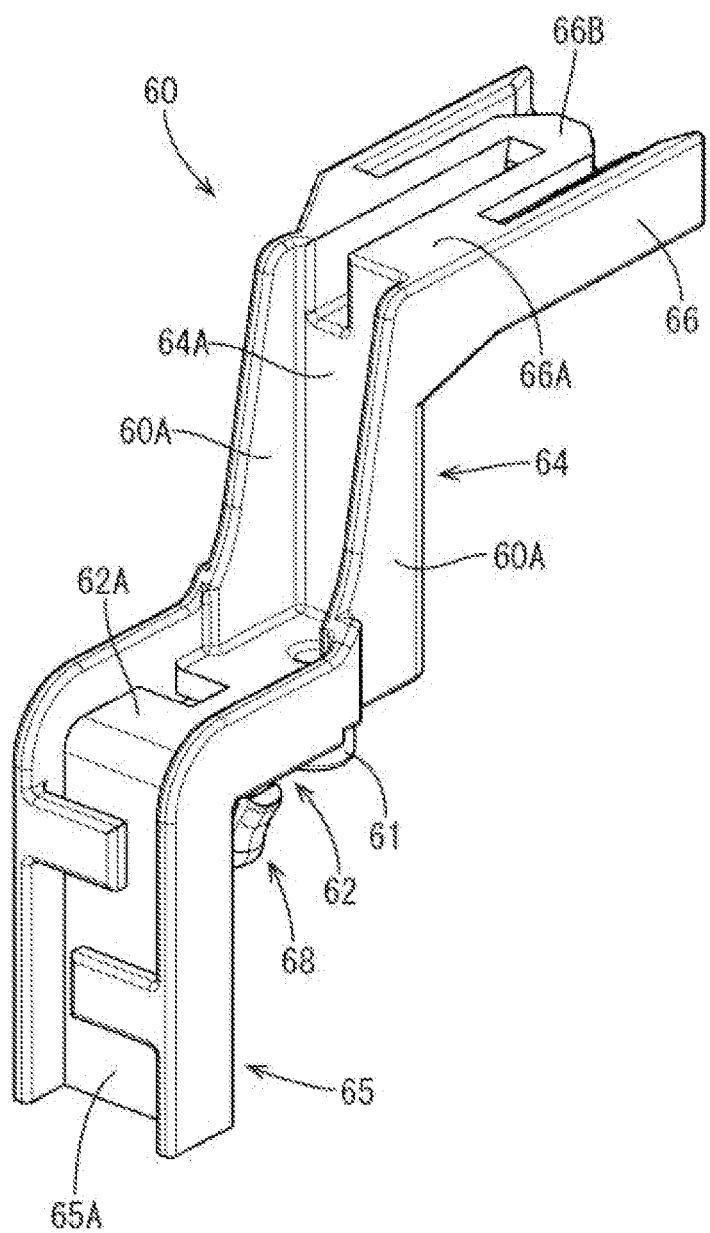
FIG. 17 is a perspective view of a holding member.
Figure 18:
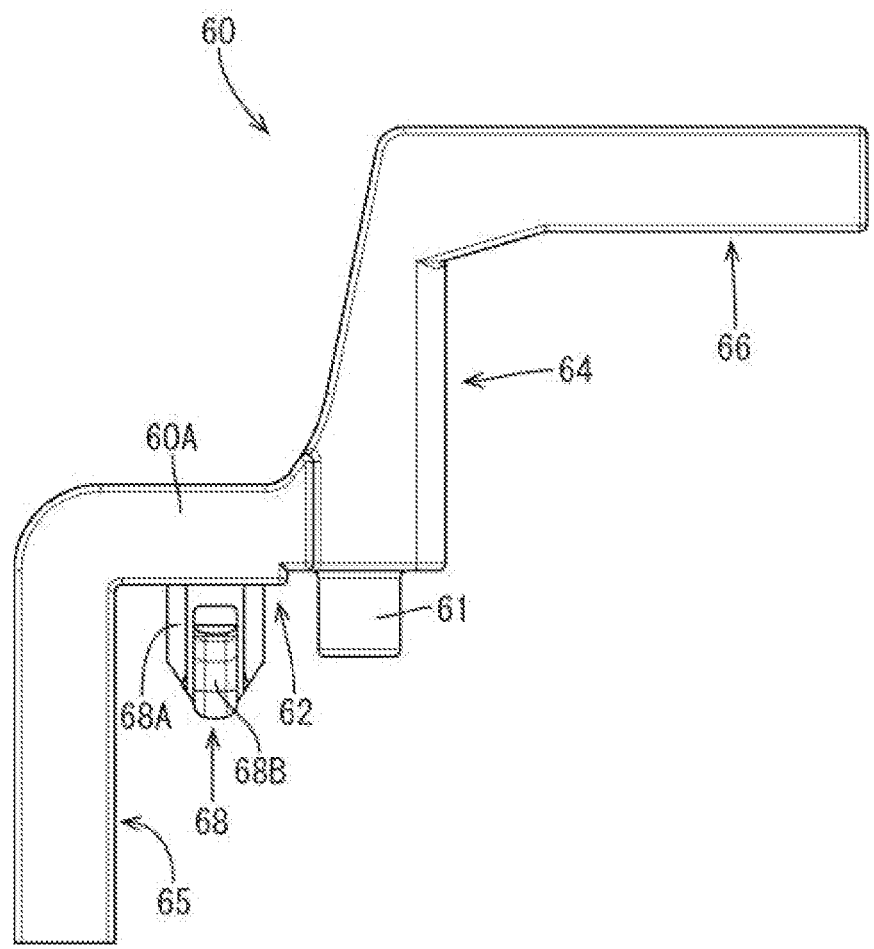
FIG. 18 is a side view of the holding member.
Figure 19:
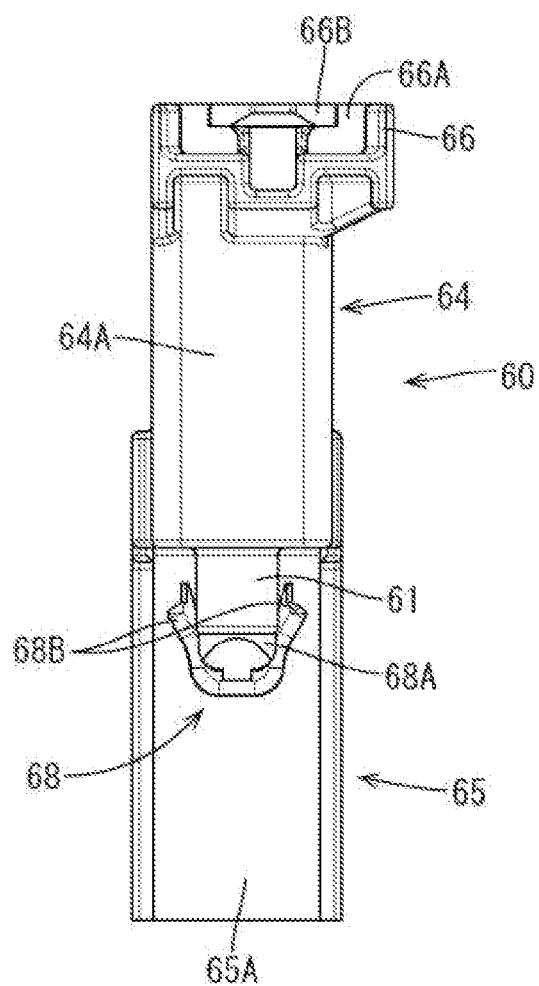
FIG. 19 is a front view of the holding member.

As illustrated in FIGS. 17 to 19, the fixing portion 62 includes a fixing plate 62A that is a quadrangular plate and is disposed along the mount plate 92 of the bracket 91. The fixing plate 62A includes a positioning pin 61 and a fitting portion 68 on a right surface thereof that is opposite the bracket 91.

The positioning pin 61 has a columnar shape and can be fitted in a positioning hole (not illustrated) in the mount plate 92. The fitting portion 68 includes a column portion 68A and a pair of elastic pieces 68B. The column portion 68A projects rightward from a right surface of the fixing plate 62A. The elastic pieces 68B extend leftward from a projected end of the column portion 68A to spread toward a lateral side while one ends thereof being supported. The fitting portion 68 is inserted in a mount hole (not illustrated) of the mount plate. The positioning pin 61 is inserted in the positioning hole and the column portion 68A and the pair of elastic pieces 68B are inserted in the mount hole. Accordingly, the mount plate 92 is sandwiched by the fixing portion 62 and the pair of elastic pieces 68B and the holding member 60 is fixed to the bracket 91 while being positioned with respect to the bracket 91.

As illustrated in FIGS. 17 to 19, the first electric wire arrangement portion 64 includes a first extending plate 64A extending from a front edge of the fixing plate 62A. The first extending plate 64A is a quadrangular flat plate and extends leftward from the front edge of the fixing plate 62A.

The second electric wire arrangement portion 65 includes a second extending plate 65A extending from a rear edge of the fixing plate 62A. The second extending plate 65A is a quadrangular flat plate and extends rightward from the rear edge of the fixing plate 62A.

As illustrated in FIGS. 6 and 11, the connector mount portion 66 includes a mount plate 66A that extends frontward from an extended edge of the first extending plate 64A of the first electric wire arrangement portion 64. The mount plate 66A includes a locking portion 66B for fixing the seat-side connector 74. The seat-side connector 74 that is fitted to the locking portion 66B of the connector mount portion 66 in the fitting direction is arranged such that the fitting direction of the seat-side connector 74 is parallel to the plate surface of the mount plate 92 and the seat-side connector 74 faces the front side.

The holding member 60 includes two protection walls 60A that are commonly included in the first electric wire arrangement portion 64, the fixing portion 62, and the second electric wire arrangement portion 65.

The two protection walls 60A extend rearward from two edges of the first extending plate 64A of the first electric wire arrangement portion 64 and the second extending plate 65A of the second electric wire arrangement portion 65, respectively, and extend leftward from two edges of the fixing plate 62A of the fixing portion 62, respectively. The first extending plate 64A, the fixing plate 62A, the second extending plate 65A, and the two protection walls 60A define a recessed portion. As illustrated in FIGS. 13 to 15, the electric wire 72 extending from the seat-side connector 74 is routed in the recessed portion while being protected from other components.

The second electric wire arrangement portion 65 includes retaining pieces 60B extending from rear end portions of the two protection walls 60A. The retaining pieces 60B suppress the electric wire arranged in the second electric wire arrangement portion 65 from moving away from the recessed portion. In this embodiment, each of the two protection walls 60A includes one retaining piece 60B and the retaining pieces 60B are in different positions with respect to the right-left direction. Each of the retaining pieces 60B has a substantially quadrangular plate shape and extends from the rear end portion of one of the protection walls 60A toward another one of the protection walls.

The uncovered portion 42 of the second arm section 40 includes an arrangement section 44 in which the arm-side connector 24 of the arm-side wire harness 22 and the electric wire 26 that is connected to the arm-side connector 24 are arranged.

As illustrated in FIGS. 5 and 6, the arrangement section 44 has a space that is defined by the inner wall 36 and a wall continuously including in the peripheral direction a bottom wall 46, which is continuous from lower end portions of the separation wall 33 and the inner wall 36, an outer peripheral wall of the bolt receiving section 34, the separation wall 33, and the peripheral wall 53 of the cover 50.

The arrangement section 44 includes a long section 45 in a section below the bolt receiving section 34. The long section 45 is elongated in the front-rear direction while having the bolt receiving section 34 in a middle section thereof. The inner wall 36 of the long section 45 includes an electric wire insertion hole 44A in a middle section with respect to the front-rear direction. The electric wiring cavity of the second arm section 40 is continuous from the arrangement section 44 via the electric wire insertion hole 44A. A grommet G is mounted in the electric wire insertion hole 44A and the electric wire 26 of the arm-side wire harness 22 extends into the arrangement section 44 via the grommet G. The electric wire 26 extending into the arrangement section 44 includes the arm-side connector 24 at the end thereof and the arm-side connector 24 and the electric wire 26 are arranged in the arrangement section 44.

The uncovered portion 42 includes a connector insertion hole 47 on a rear side with respect to the bolt receiving section 34. The seat-side wire harness 70 is inserted in the connector insertion hole 47 while the seat-side connector 74 of the seat-side wire harness 70 being attached to the holding member 60.

As illustrated in FIG. 5, the connector insertion hole 47 continuously extends through the inner wall 36 and the outer wall 31B in the right-left direction and the connector insertion hole 47 and the arrangement section 44 are continuous from each other. With such a configuration, when the arm body member 30 is fixed to the bracket 91 of the seat frame 90, the first electric wire arrangement portion 64 and the connector mount portion 66 of the holding member 60 that extend leftward from the mount plate 92 of the bracket 91 are inserted in the arrangement section 44 through the connector insertion hole 47.

As illustrated in FIGS. 4, 6, 9, and 11, the connector mount portion 66 that is in the arrangement section 44 extends frontward and is parallel to the plate surface of the inner wall 36. When the arm body member 30 is in the arm support position, the fitting portion 73 of the seat-side connector 74 that is attached to the connector mount portion 66 is in the middle section of the long section 45 of the arrangement section 44 with respect to the front-rear direction while facing the front side.

When the seat-side connector 74 is in the long section 45 of the arrangement section 44, as illustrated in FIG. 5, the first electric wire arrangement portion 64, the fixing portion 62, and the second electric wire arrangement portion 65 in which the electric wire 72 of the seat-side wire harness 70 is arranged are inserted through the connector insertion hole 47 that extend through the outer wall 31B and the inner wall 36.

Figure 8:
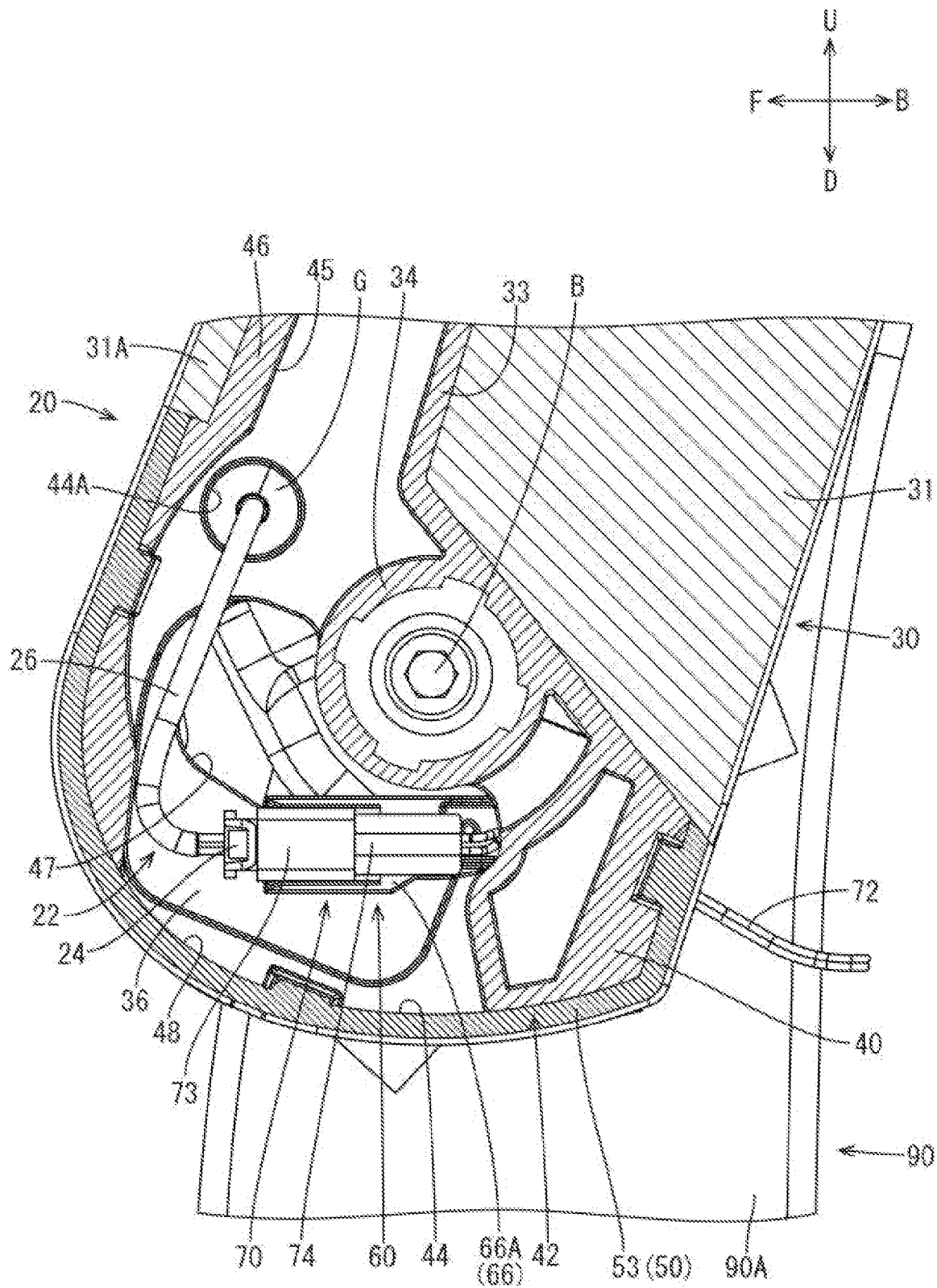
FIG. 8 is a cross-sectional view illustrating the armrest that is fixed to the seat frame and in the lift-up position and is a cross-sectional view taken similarly to FIG. 4.

As illustrated in FIGS. 4, 8, and 10, the connector insertion hole 47 has an arched shape around the support bolt B. With such a configuration, when the arm body member 30 moves between the arm support position and the lift-up position, the first electric wire arrangement portion 64, the fixing portion, and the second electric wire arrangement portion 65 of the holding member 60 are less likely to be contacted with the inner wall 36 and the outer wall 31B.

The arrangement section 44 of the uncovered portion 42 includes an operation hole 48 in the left edge portion thereof. The operation hole 48 opens toward an opposite side from the seat frame 90 side (the left side).

As illustrated in FIGS. 9 to 12, the operation hole 48 is larger than the connector insertion hole 47. As illustrated in FIG. 5, the operation hole 48 is continuous from the connector insertion hole 47 through the arrangement section 44. As illustrated in FIGS. 9 to 12, the connector insertion hole 47 and the arrangement section 44 are completely seen from the left side through the operation hole 48.

An operator can easily put the seat-side wire harness 70 that is mounted on the holding member 60 in the arrangement section 44 through the operation hole 48. The seat-side connector 74 of the seat-side wire harness 70 that is put in the arrangement section 44 is in a middle section of the long section 45 of the arrangement section 44 with respect to the front-rear direction. Therefore, a sufficient coupling stroke length for coupling the arm-side connector 24 and the seat-side connector 74 can be ensured and the connectors 24, 74 can be easily coupled.

The cover 50 is attached to the uncovered portion 42 from the left side after the arm-side connector 24 and the seat-side connector 74 are coupled together. Accordingly, as illustrated in FIGS. 5 and 6, the operation hole 48 is covered with the cover body 51 from the left side.

This embodiment includes the above-described configuration and one example of steps of mounting the armrest 20 on the seat 80 will be simply described and operations and advantageous effects thereof will be described next.

First, the positioning pin 61 and the fitting portion 68 of the bracket 91 of the seat frame 90 are inserted in the positioning hole and the mount hole and the holding member 60 on which the seat-side wire harness 70 is mounted is fixed to the bracket 91. Accordingly, as illustrated in FIGS. 13 to 15, the seat-side wire harness 70 that is supported by the holding member 60 is fixed to the seat 80.

Next, the arm body member 30 in which the arm-side wire harness 22 is previously arranged is prepared and the arm body member 30 is fixed to the seat 80.

The arm body member 30 is fixed to the seat 80 such that the holding member 60 holding the seat-side wire harness 70 is inserted in the connector insertion hole 47 of the second arm section 40 of the arm body member 30 and the outer wall 31B of the first arm section 31 is contacted with the mount plate 92 of the bracket 91 from the left side.

Figure 12:
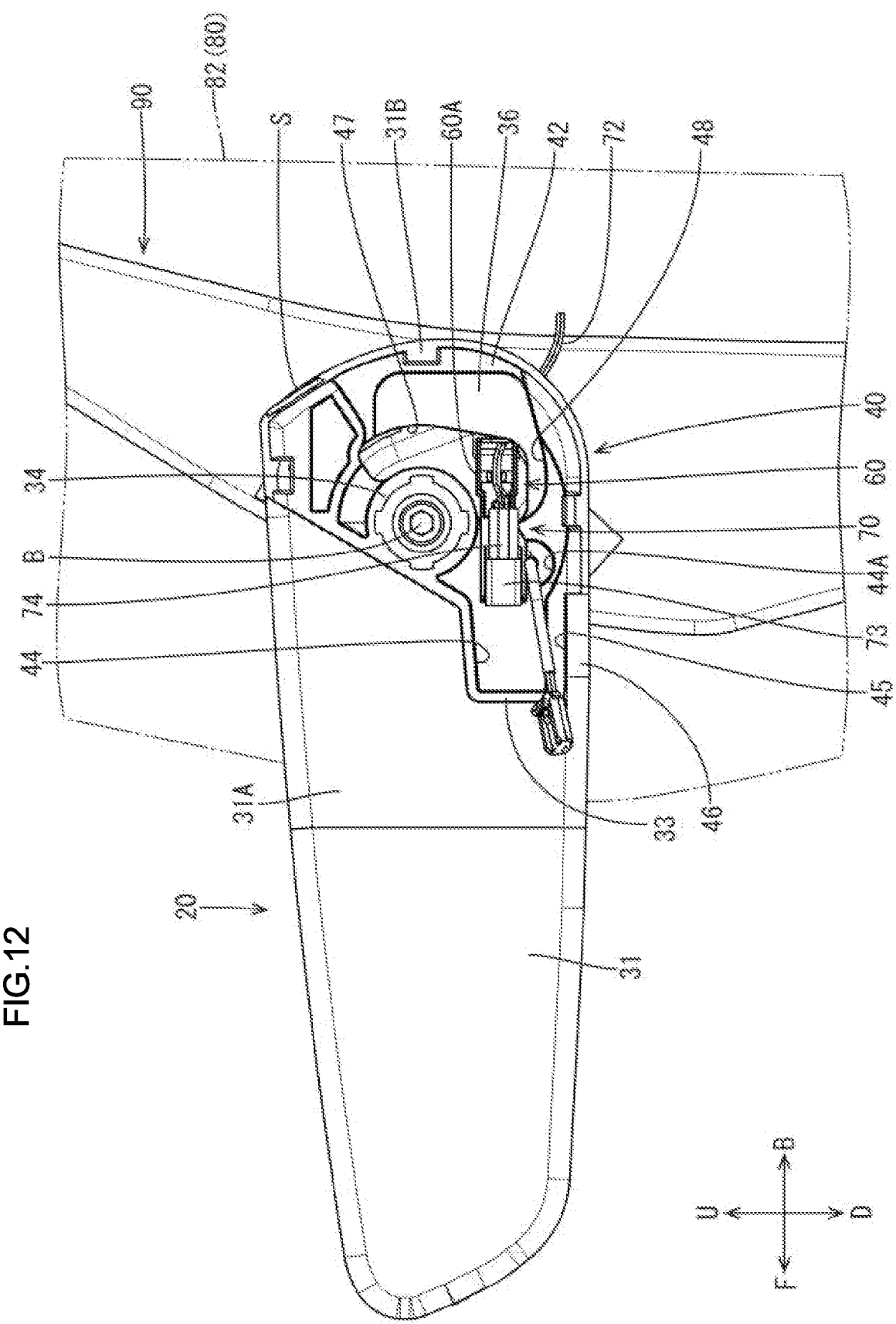
FIG. 12 is an enlarged side view illustrating a seat-side connector and an arm-side connector that are not coupled.

When the outer wall 31B is contacted with the mount plate 92, as illustrated in FIG. 12, the connector mount portion 66 and the first electric wire arrangement portion 64 of the holding member 60 are inserted into the long section 45 of the arrangement section 44 of the uncovered portion 42. The holding member 60 is disposed such that the fitting portion 73 faces the front side and the coupling direction of the seat-side connector 74 that is supported by the holding member 60 is parallel to the inner wall of the arrangement section 44. As illustrated in FIGS. 5 and 9, the first electric wire arrangement portion 64, the fixing portion 62, and the second electric wire arrangement portion 65 in which the electric wire 72 of the seat-side wire harness 70 is arranged are inserted through the connector insertion hole 47 in the outer wall 31B and the inner wall 36. In mounting of the arm body member 30, the guide pin 91A of the bracket 91 is inserted in a guide hole of the arm body member 30.

Next, the support bolt B is fitted in the bolt receiving section 34 of the second arm section 40 of the arm body member 30 from the left side and the support bolt B that is fitted in the bolt receiving section 34 is inserted through the bolt insertion hole 92A of the bracket 91 to be screwed to the two nuts that are arranged on the seat frame 90 side. Accordingly, the arm body member 30 is fixed to the bracket 91 to be pivotably moved between the arm support position and the lift-up position.

Next, as illustrated in FIGS. 9 to 12, the arm-side connector 24 of the arm-side wire harness 22 is fitted in the fitting portion 73 of the seat-side connector 74 that is arranged in the arrangement section 44.

Since the connector insertion hole 47 and the arrangement section 44 can be completely seen through the operation hole 48, the coupling operation of coupling the fitting portion 73 of the seat-side connector 74 that is arranged in the long section 45 of the arrangement section 44 and the arm-side connector 24 can be easily performed through the operation hole 48.

In the coupling of the seat-side connector 74 and the arm-side connector 24, the arm-side connector 24 is coupled to the seat-side connector 74 from the left side. In this operation, the electric wire necessarily has a coupling stroke length that allows the arm-side connector 24 to move in the right-left direction.

However, after finishing the coupling of the seat-side connector 74 and the arm-side connector 24, a portion of the electric wire corresponding to the coupling stroke length becomes an extra wire portion within the arm body member 30.

In this embodiment, as illustrated in FIGS. 9 to 12, the seat-side connector 74 is disposed in the middle section of the long section 45 of the arrangement section 44 with respect to the front-rear direction. Therefore, the connectors 24, 74 and the extra wire portion of the electric wire corresponding to the coupling stroke length necessary for the coupling operation of the seat-side connector 74 and the arm-side connector 24 can be arranged in the arrangement section 44.

Namely, according to this embodiment, the extra wire portion of the electric wire included in the arm-side wire harness 22 can be handled appropriately and easily. Therefore, the operability of mounting the armrest 20 on the seat 80 is further improved.

As described before, the armrest 20 of this embodiment includes the arm-side wire harness 22 and the arm body member 30. The arm-side wire harness 22 includes at least an electric wire 26 and the arm-side connector 24 that is connected to an end of the electric wire 26 and to be coupled to the seat-side connector (the mount member-side connector) 74 mounted on the seat (the mount member) 80. The arm body member 30 includes the arrangement section 44 in which the electric wire 26 of the arm-side wire harness 22 is arranged and the outer wall (the mount member-side wall) 31B that is opposite the seat frame 90 of the seat 80. The arm body member 30 is fixed to the seat 80 while the outer wall 31B being opposite the seat frame 90. As illustrated in FIGS. 9 to 12, the outer wall 31B includes the connector insertion hole 47 through which the seat-side connector 74 can be inserted and the connector insertion hole 47 is continuous from the arrangement section 44. The arm-side connector 24 and the seat-side connector 74 can be arranged in the arrangement section 44 and the arm body member 30 includes the operation hole 48 that is continuous from the connector insertion hole 47.

When the arm body member 30 is fixed to the seat frame 90 such that the outer wall 31B is opposite the seat frame 90, the seat-side connector 74 can be put in the arrangement section 44 through the connector insertion hole 47 and the seat-side connector 74 and the arm-side connector 24 can be coupled together through the operation hole 48.

After the seat-side connector 74 and the arm-side connector 24 are coupled together, the connectors 24, 74 can be arranged in the arrangement section 44. Therefore, the process of arranging the connectors 24, 74 can be performed easily and this improves the operability of mounting the armrest 20 on the seat 80.

As illustrated in FIGS. 5 and 6, since the cover 50 that is for closing the operation hole 48 can be attached to and detached from the arm body member 30, the operation hole 48 can be closed after the seat-side connector 74 and the arm-side connector 24 are coupled together. According to such a configuration, the connectors 24, 74 arranged in the arrangement section 44 can be protected compared to a configuration in which the operation hole 48 is not closed. Since the operation hole 48 is closed, the arm body member 30 is less likely to be reduced in strength.

Each of the wire harnesses 22, 70 needs to have the extra wire portion in the electric wire corresponding to the coupling stroke length to couple the seat-side connector 74 and the arm-side connector 24 together. However, an additional process is necessary for dealing with the extra wire portion corresponding to the coupling stroke length after coupling the connectors 24, 74 together.

As illustrated in FIGS. 9 to 12, the electric wire including the extra wire portion corresponding to the coupling stroke length for coupling the seat-side connector 74 and the arm-side connector 24 can be arranged in the arrangement section 44 of the arm body member 30. With such a configuration, the extra wire portions of the electric wires included in the seat-side wire harness 70 and the arm-side wire harness 22 can be easily handled. This improves the operability of mounting the armrest 20 on the seat 80.

The seat with an armrest 10 according to this embodiment includes the armrest 20 and the seat 80. The seat-side connector 74 is fixed to the holding member (the holder) 60 that is attached to the seat 80. The seat-side connector 74 that is fixed to the holding member 60 is inserted into the arrangement section 44 through the connector insertion hole 47 when the arm body member 30 is fixed to the seat 80.

According to such a configuration, when the arm body member 30 is fixed to the seat 80, the seat-side connector 74 that is fixed to the holding member (the holder) 60 is arranged in the arrangement section 44. This makes the arm-side connector 24 to be coupled to the seat-side connector 74 easily and the coupling operation through the operation hole 48 can be performed more easily. This further improves the operability of mounting the armrest 20 on the seat 80.

As illustrated in FIGS. 5, 9, and 11, the holding member 60 includes the first electric wire arrangement portion 64, the fixing portion 62, and the second electric wire arrangement portion 65 (an electric wire arrangement portion) in which the electric wire 72 extending from the seat-side connector 74 is routed from the seat 80 side toward the armrest 20 to cover side portions of the electric wire 72. The first electric wire arrangement portion 64, the fixing portion 62, and the second electric wire arrangement portion 65 are inserted through the connector insertion hole 47 when the arm body member 30 is fixed to the seat 80. Therefore, the electric wire 72 of the seat-side connector 74 is less likely to be damaged by the hole edge of the connector insertion hole due to vibrations.

As illustrated in FIGS. 6 and 8 to 12, the holding member 60 includes the connector mount portion 66 to which the seat-side connector 74 is coupled such that the coupling direction of the seat-side connector 74 is parallel to the outer wall 31B.

When the seat-side connector 74 and the arm-side connector 24 are coupled together, the connectors 24, 74 are disposed parallel to the outer wall 31B. This suppresses the thickness (in the right-left direction) of the arm body member 30 including the arrangement section from increasing and suppresses the thickness (in the right-left direction) of the armrest 20 from increasing.

OTHER EMBODIMENTS

The technology disclosed herein is not limited to the embodiment described above and illustrated in the drawings. For example, the following embodiments will be included in the technical scope of the technology.

(1) In the above embodiment, the armrest 20 is mounted on the seat 80 of a vehicle. However, the armrest may be mounted on a seat of an aircraft, a ship, or a train and may be mounted on any component as necessary.

(2) In the above embodiment, the armrest 20 is mounted on the left side portion of the seat 80. However, the armrest may be mounted on a right side portion of a seat or right and left side portions of a seat.

(3) In the above embodiment, the arm body member 30 is pivotable with respect to the bracket 91 of the seat frame 90. However, the arm body member may be fixed to the bracket so as not to pivot.

(4) In the above embodiment, the holding member 60 is made of synthetic resin. However, the holding member may be made of metal or formed integrally with the bracket.

(5) In the above embodiment, the seat-side connector 74 is arranged in the arrangement section 44 such that the seat-side connector 74 is disposed to face the front side and parallel to the outer wall 31B. However, the seat-side connector may be arranged to face a direction crossing the outer wall if the connectors are formed in a small size or the arrangement section of the arm body member is formed to be greater in size in the right-left direction.

EXPLANATION OF SYMBOLS

- 10: seat with an armrest
- 20: armrest
- 22: arm-side wire harness
- 24: arm-side connector
- 30: arm body member
- 31B: outer wall (one example of mount member-side wall)
- 44: arrangement section
- 47: connector insertion hole
- 48: operation hall
- 50: cover
- 60: holding member (one example of a holder)
- 62: fixing portion (one example of an electric wire arrangement portion)
- 64: first electric wire arrangement portion (one example of the electric wire arrangement portion)
- 65: second electric wire arrangement portion (one example of the electric wire arrangement portion)
- 66: connector mount portion
- 72: electric wire
- 74: seat-side connector (one example of a mount member-side connector)
- 80: seat (one example of a mount member)

The invention claimed is:

1. An armrest comprising:
    an arm-side wire harness including an electric wire and an arm-side connector that is on an end of the electric wire and is to be coupled to a mount member-side connector mounted on a mount member; and
    an arm body member including an arrangement section in which the electric wire of the arm-side wire harness is arranged and a mount member-side wall that is to be arranged opposite the mount member, wherein the arm body member is configured to be fixed to the mount member while the mount member-side wall is opposite the mount member, wherein
    the mount member-side wall includes a connector insertion hole through which the mount member-side connector is configured to be inserted,
    the arm-side connector and the mount member-side connector are configured to be arranged in the arrangement section,
    the arm body member includes an operation hole that is continuous from the arrangement section, and
    the operation hole opens toward an opposite side from the mount member.

2. The armrest according to claim 1, further comprising a cover that is attached to the arm body member to close the operation hole.

3. The armrest according to claim 1, wherein the electric wire is arranged in the arrangement section and has a length that includes a coupling stroke length for coupling the mount member-side connector and the arm-side connector.

4. A seat with an armrest comprising:
    the armrest according to claim 1; and
    the mount member, wherein
    the mount member is the seat,
    the mount member-side connector is fixed to a holder that is mounted on the seat, and
    the mount member-side connector that is fixed to the holder is inserted in the arrangement section through the connector insertion hole in a state that the arm body member is fixed to the mount member.

5. The seat with an armrest according to claim 4, wherein
    the holder includes an electric wire arrangement portion in which the electric wire extending from the mount member-side connector is routed from the seat toward the armrest to cover side portions of the electric wire, and
    the electric wire arrangement portion is inserted through the connector insertion hole in a state that the arm body member is fixed to the mount member.

6. The seat with an armrest according to claim 4, wherein the holder includes a connector mount portion to which the mount member-side connector is coupled such that a coupling direction of the mount member-side connector is parallel to the mount member-side wall.

* * * * *